United States Patent Office 3,488,616
Patented Jan. 6, 1970

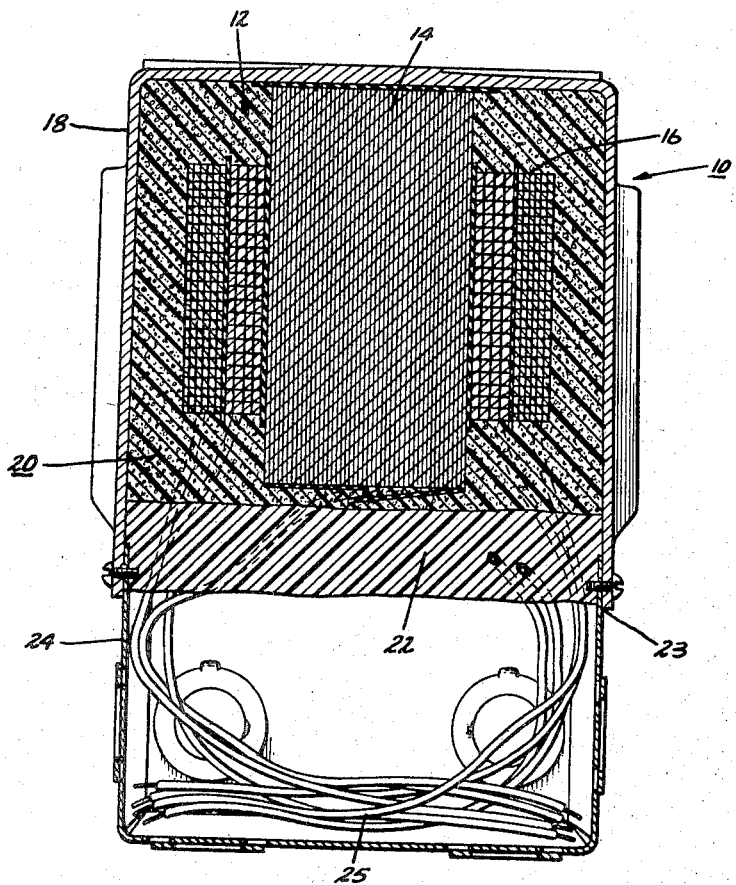

3,488,616
DRY TYPE TRANSFORMER WITH IMPROVED ENCAPSULATING COMPOSITION
George I. Duncan and Robert D. Mees, Fort Wayne, Ind., assignors to General Electric Company, a corporation of New York
Filed Apr. 18, 1967, Ser. No. 631,723
Int. Cl. C08f 45/04, 15/16
U.S. Cl. 336—96                    8 Claims

ABSTRACT OF THE DISCLOSURE

A dry type transformer having a case and a magnetic core and insulated coil coated with iso- or terephthalate polyester, and an encapsulating composition which is non-reacting with the coil insulation and secures the core and coil in the case. The encapsulating composition comprises from 75 to 82 percent by weight of granular filler material having a maximum ferrous oxide content of 0.110 percent and a majority of the sand by weight having a particle size in the range of 1981 to 833 microns, and from 25 to 18 percent of a cured resin. The resin includes from 66 to 87 percent by weight of a polymer selected from the class consisting of polybutadiene having from 20 to 72 percent vinyl unsaturation and fumarate isophthalate glycol polyester modified with di-cyclo pentadiene; from 34 to 13 percent by weight of a monomer selected from the class consisting of diallyl maleate, trimethylol propane trimethacrylate, diallyl phthalate, dioctyl fumarate, triallyl cyanurate, triallyl isocyanurate and diallyl chlorendate; and less than 1 percent by weight of a catalyst selected from the class consisting of 2,5-dimethyl-2,5 di-t-butylperoxy hexane and dicumyl peroxide.

BACKGROUND OF THE INVENTION

This invention relates generally to improved encapsulating compositions for inductive devices, and more specifically to improved encapsulating compositions for use in connection with the magnetic core and coil assemblies of dry type transformers.

Dry type transformers normally include a magnetic core and coil assembly usually housed in a transformer case or enclosure. In one type of transformer construction, the core and coil assembly is totally enclosed within a metallic case, and an encapsulating mass is formed in the space between the assembly and the case. Preferably, the encapsulating mass should adequately support the core and coil assembly in the case, serve as a heat transferring medium, and provide electrical insulation between the core and coil assembly and the metallic case.

There are numerous materials presently used for encapsulating electrical devices, including sand-filled asphalt systems and various synthetic resin systems. Difficulties have been encountered in applying these materials as encapsulants for electrical devices. For example, sand-filled asphalt systems do not perform well at high temperatures, e.g., at 180° C. or higher, becoming soft and losing their mechanical rigidity. Certain synthetic resins have been found to be incompatible with the wire insulation used in the electrical coil or coils of the coil assembly. The resin encapsulant must not attack and degrade the wire insulation, either during curing of the resin or after continued contact between the resin and insulation after the resin is cured. Where sand is used as a filler, often thermally insulating voids in the encapsulant result, and such voids are, of course, detrimental to the heat dissipation characteristics of the transformer.

Accordingly, it is an object of the present invention to provide an inductive device with an improved encapsulating composition.

It is another object of the present invention to provide an improved dry type transformer having an improved encapsulating arrangement wherein the transformer core and coil assembly are securely anchored in the case.

It is yet another object of the present invention to provide an improved dry type transformer with an encapsulating composition having improved heat transfer characteristics.

It is a final object of the present invention to provide an improved dry type transformer utilizing a resin encapsulating material that is compatible with commonly used wire insulations.

SUMMARY OF THE INVENTION

Briefly stated, we have provided in one form of our invention a thermally conductive and electrically insulating encapsulating composition comprising granular filler material ranging from 75 to 82 percent by weight, and from 25 to 18 percent by weight of the cured reaction product of a resin including from 66 to 87 percent by weight of a polymer selected from the class consisting of polybutadiene and fumarate isophthalate glycol polyester modified with di-cyclo pentadiene; from 34 to 13 percent by weight of at least one monomer selected from the group consisting of diallyl maleate, trimethylol propane trimethacrylate, diallyl isophthalate, ethylene glycol dimethacrylate, diallyl phthalate, dioctyl fumarate, triallyl cyanurate, triallyl isocyanurate and diallyl chlorendate; and not more than 1.5 percent by weight of a catalyst selected from a group consisting of 2,5-dimethyl-2,5 di-t-butylperoxy hexane and dicumyl peroxide.

In another aspect of the invention, a dry type transformer having an enclosed core and coil assembly is filled with the improved encapsulating composition. The granular filler material is comprised of round particles of substantially pure silicon dioxide having a maximum ferrous oxide or iron content of 0.110 percent and a maximum water content of 0.01 percent by weight. In addition, a majority of the particles by weight have a particle size that is preferably in the range of 1981 to 833 microns.

The subject matter of the invention is set forth in the appended claims. The invention itself, however, and further objects and advantages thereof may be understood by referring to the accompanying description taken in connection with the drawing.

BRIEF DESCRIPTION OF THE DRAWING

The drawing illustrates in cross section a dry type transformer having a totally enclosed core and coil assembly with the encapsulating composition of this invention shown in the space between the core and coil assembly and the outer case.

DESCRIPTION OF THE PREFERRED EMBODIMENTS

Referring now to the drawing, a transformer 10 in accordance with the invention is provided with a core and coil assembly 12 including a magnetic core 14 and a coil 16. The core and coil assembly 12 may be any suitable type such as, for example, the core and coil assembly as shown in the U.S. Patent of A. F. Mittermaier, No. 3,270,308, and is contained within the transformer case or enclosure 18. A foam barrier 22 is positioned in the open end 23 of the transformer case 18, and a lead compartment 24 fitted to the open end to contain the transformer leads 25.

The sand or granular filler material used in the exemplification of the invention must be carefully selected as to size, purity and shape in order to provide a substantially void-free encapsulating mass 20 and in the exemplification was a high grade, 99 percent pure silicon dioxide sand. Preferably at least 95 percent by weight of the sand is between U.S. Standard Sieve Sizes 10 and 20, i.e., within the range of 1981 and 833 microns in size. In addition, in order to provide the maximum dispersion of the particles in the resin compound during the formation of the encapsulating mass 20, it is extremely desirable for at least 70 percent of the sand by weight to be between U.S. Standard Sieve Sizes 14 and 16, i.e., within the range of 1397 to 1167 microns in size. An even sand-resin dispersion is, of course, necessary to provide the encapsulating mass 20 with good thermal conduction properties.

In order to further provide a good thermal dissipation path for the totally enclosed core and coil assembly 12, we found that it was possible to include in the encapsulating mass 20 a greater percentage of inert filler or sand than is normally used in other inert filler systems of which we are aware. With the improved composition we are able to use as much as 82 percent by weight of sand. Preferably, not less than 75 percent by weight should be used. Preferably, the particles of sand should be round since it was found that this minimizes the entrapment of air during fabrication and will thereby provide a substantially void-free encapsulating mass. Also, it is preferred that the viscosity of the resin be relatively low or below 250 centipoises to enable the resin to flow easily into the interstices between the sand particles.

The preferred maximum ferrous oxide or iron content of the sand is 0.110 percent by weight and the preferred maximum water content is 0.01 percent by weight. We have found that an excessive amount of ferrous oxide will inhibit the curing reactions of the resin and may also result in air pockets or voids in the final encapsulated mass 20. Water in the sand may result in undesirable oxidation reactions with the cured resin. A suitable sand that may be used in the exemplification of the invention is manufactured by the Pennsylvania Glass Sands Corporation and sold under the trade name Special 10–20 San-Saba Sand. It will be understood, however, that other suitable granular materials than the exemplified sand may be employed in the encapsulating composition, so long as they are inert, and of the required size, shape, and purity.

As was noted briefly above, the resin used in the improved encapsulating composition must be compatible with the insulation on the coil 16, which in the exemplification of the invention were the isophthalate or terephthlate polyesters. These polyesters are fully described in U.S. Patent No. 2,936,296—Precopio and Fox, assigned to the same assignee as the present invention.

The preferred resin composition comprises 80 percent by weight of polybutadiene having from 20 to 72 percent vinyl unsaturation; 16 percent by weight of a first monomer, diallyl maleate (hereinafter referred to as DAM); 4 percent by weight of a second monomer, trimethylol propane trimethacrylate (hereinafter referred to as TMPT); and less than 1 percent by weight of a suitable catalyst or initiator and a suitable inhibitor.

The polybutadiene is a high molucular weight material (approximately 2500) and is fast curing when reacted with the two preferred monomers. The two monomers, DAM and TMPT, are added in order to react with the base resin polymer and effect a cure thereof, the rate of cure depending in part upon the particular curing temperature. The TMPT accelerates the cure of the resin. In addition, the TMPT has excellent wetting properties, thereby coating the sand particles and permitting air to be easily removed from the encapsulating mass 20.

The catalyst in the exemplification is 2,5-dimethyl-2,5 di-t-butylperoxy hexane, a high temperature oxidizing agent, which is added to initiate vinyl polymerization and hence shorten the curing time of the polybutadiene. The presence of a catalyst, in the range of from 0.75 to 1.5 percent by weight is required to initiate the curing reaction. The inhibitor used in the exemplification of our invention is 1,4 benzenediol and is added to prevent reaction between the polymer and monomers at room temperatures, such as during storage.

We have found by actual test that the ingredients in the exemplified resin composition are substantially non-reacting chemically with various common wire insulations during the in-residence time with the coil 16 prior to cure of the resin composition. Table I below sets forth the results of actual in-residence tests of the various resin composition constituents and several wire insulations. These tests were conducted by locating a length of insulation coated wire partly submerged in a pool of the liquid constituent and heating the constituent to the specified temperature. A portion of the wire was thereby subjected to the constituent in its liquid state, and another portion, above the pool, was subjected to the vapor state of the constituent. The vapor was condensed and returned to the pool during the period of testing, and the temperature was maintained substantially constant by a thermostatically controlled heating means.

TABLE I.—EFFECT OF CONSTITUENTS OF RESIN
[Composition of Example 1 on Wire Insulations]

| Material | Temp., °C. | Time, hours | Isophthalate or Terephthalate Polyester [1] | Nylon [2] |
| --- | --- | --- | --- | --- |
| Polybutadiene: | | | | |
| Liquid | 200 | 2 | No effect | No effect. |
| Vapor | 200 | 2 | do | Do. |
| DAM: | | | | |
| Liquid | 125 | 12 | do | Do. |
| Vapor | 125 | 12 | do | Do. |
| TMPT: | | | | |
| Liquid | 180 | 2 | do | Slight peeling. |
| Vapor | 180 | 2 | do | No effect. |
| Mixture of 20 parts DAM, 5 parts TMPT, 0.2 part 1,4 benzenediol: | | | | |
| Liquid | 125 | 5 | do | Slight peeling. |
| Vapor | 125 | 5 | do | No effect. |

[1] On aluminum wire.
[2] On copper wire.

It should be noted that the exemplified resin composition cures in less than two hours. Therefore, the various ingredients of the improved composition are in contact with the wire insulation on coil 16 while the resin is in an uncured state only for a short time, and this, of course, further inhibits any reaction between the wire insulation and resin.

The following examples set forth the exemplified resin composition described above, and also other resin compositions which we have found to be satisfactory for the purpose of forming the encapsulating mass 20. In the examples, each indicated quantity is by weight.

Example 1

In this example, we combined 20 parts of DAM, 5 parts of TMPT, 1.0 part of 2,5-dimethyl-2,5 di-t-butylperoxy hexane and 0.2 part of 1,4 benzenediene. This mixture was then combined with 100 parts of polybutadiene having approximately 65 percent vinyl unsaturation to form the resin composition. This resin composition was found to have a viscosity of approximately 100 centipoises at 100 degrees centigrade.

Example 2

0.2 part of 1,4 benezenediol was added to 5 parts of TMPT in order to lend stability to the TMPT. This mixture was then combined with 20 parts of DAM and 1 part of 2,5-dimethyl-2,5 di-t-butylperoxy hexane. The resulting mixture was added to 100 parts of polybutadiene having approximately 65 percent vinyl unsaturation to form the resin composition.

Example 3

We added 0.05 part of 1,4 benezenediol to 100 parts of polybutadiene having approximately 65 percent vinyl unsaturation. Separately, 0.15 part of 1,4 benezenediol was added to 5 parts of TMPT, and this mixture was combined with 20 parts of DAM and 1 part of 2,5-dimethyl-2,5 di-t-butylperoxy hexane. This mixture was then combined with the polybutadiene-1,4 benezenediol mixture in order to form the resin compound. We found that by adding a portion of the 1,4 benzenediol to the polybutadiene in the above manner, we were able to reduce surface skimming and aging of the polybutadiene.

Example 4

In this example, we followed the procedure of Example 1 above using 20 parts of DAM, but we did not add any TMPT.

Example 5

We followed the procedure of Example 1 above using 15 parts of DAM but did not use any TMPT.

Example 6

In this example, we combined 40 parts of DAM, 1.0 part of 2,5-dimethyl-2,5 di-t-butylperoxy hexane and 0.2 part of 1,4 benzenediol. This mixture was then combined with 100 parts of fumarate isophthalate glycol polyester modified with di-cyclo-pentadiene in order to produce a resin composition which we found to be satisfactory in forming the encapsulating mass 20.

Example 7

In this example, we followed the procedure of Example 6, using 50 parts of DAM rather than 40 parts thereof.

Example 8

We combined 45 parts of DAM with 5 parts of diallyl isophthalate, 1.0 part of 2,5-dimethyl-2,5 di-t-butylperoxy hexane and 0.2 part of 1,4 benzenediol. This mixture was added to 100 parts of polybutadiene having approximately 65 percent vinyl unsaturation to form the resin composition.

Each of the compositions given in the above examples was found to have a viscosity of less than 250 centipoises at 100 degrees centigrade. No chemical or physical changes were observed in the wire insulation after two weeks at 250 degrees centigrade.

In addition, samples of the cured encapsulating masses formed with 10–20 San Saba Sand and the resin compositions given in the above examples experienced less than a 10 percent weight loss after two weeks at 300 degrees centigrade. This test was performed in the usual manner in a hot air circulating oven. The weight losses for encapsulating masses formed with the compositions of Examples 1–3 and Example 8 were 8.52 percent and 8.10 percent respectively. This low weight loss is an important advantage since excessive weight loss would preclude it from being classified as a Class F (or 180° C.) material.

In Table II below we have set forth the dielectric constant, dissipation factor, insulation resistance and resistivity of the cured encapsulating mass using the composition of Example I:

TABLE II.—ELECTRICAL PROPERTIES OF ENCAPSULATING MASS (RESIN COMPOSITION OF EXAMPLE 1 AND 10–20 SAN SABA SAND IN 18:82 RATIO)

| | 25° C. | 100° C. | 180° C. |
|---|---|---|---|
| Dielectric constant | 3.89 at 1,592 hertz | 4.24 at 1,592 hertz | 4.00 at 1,592 hertz. |
| Dissipation factor | 0.0015 at 1,592 hertz | 0.0015 at 1 592 hertz | 0.1145 at 1,592 hertz. |
| Insulation resistance | 20×10$^6$ megohms | 20×10$^6$ megohms | 20×10$^6$ megohms. |
| Resistivity | 5.46×10$^6$ megohm-inch | 5.46×10$^6$ megohm-inch | 5.46×10$^6$ megohm-inch. |

It will be appreciated that the following monomers may be combined with the polymers of Examples 1, 2 or 6 in accordance with the procedures set forth in those examples: diallyl phthalate, dioctyl fumarate, trially cyanurate, triallyl isocyanurate, and diallyl chlorendate. Other suitable high temperature catalysts which may function effectively as oxidizing agents to initiate vinyl polymerization include: dimethyl peroxide, di-t-butyl peroxide, and 2,5 - dimethyl - 2,5 - bis (t-butylperoxy) hexane-3. Another inhibitor which may be used in the preparation of the resin composition is t-butyl catechol.

While in the illustrated exemplification of our invention we have shown the encapsulating composition in conjunction with a transformer device, it will be appreciated that it may be adapted for use with other electrical inductive devices, such as ballast assemblies or the like. In addition, although we have shown in the examples a polybutadiene having approximately 65 percent vinyl unsaturation, it should be understood that it may be possible to use polybutadienes having from 20 to 72 percent vinyl unsaturation, if desired. Accordingly, it is to be understood that we intend by the appended claims to cover all such modifications that fall within the true spirit and scope of the invention.

What we claim as new and desire to secure by Letters Patent of the United States is:

1. A dry type transformer comprising a case and a core and coil assembly mounted in the case; an encapsulating composition contained in the case and including from 75 to 82 percent by weight of a granular filler material having no more than 0.110 percent ferrous oxide and 0.010 percent water by weight, and from 25 to 18 percent by weight of a resin, said resin including from 66 to 87 percent by weight of the polymer polybutadiene, from 34–13 percent by weight of a monomer including diallyl maleate and trimethylol propane trimethacrylate; and less than 1 percent by weight of a catalyst selected from the class consisting of 2,5-dimethyl-2,5 di-t-butyl-peroxy hexane and dicumyl peroxide.

2. The dry type transformer of claim 1 wherein said granular filler material comprises substantially round particulate silicon dioxide, with a majority of the silicon dioxide by weight having particles ranging in size from 1981 to 833 microns.

3. The dry type transformer of claim 1 wherein said resin has a viscosity below 250 centipoises at 100 degrees centigrade and a weight loss below 10 percent after two weeks at 300 degrees centigrade.

4. A dry type transformer comprising: a case, a magnetic core and a coil wound of wire insulated with an iso or terephthalate polyester; and encapsulating composition contained in the case and comprising from 75 to 82 percent by weight of a granular filler material and from 25 to 18 percent by weight of cured resin, said cured resin including from 66 to 87 percent by weight of the polymer polybutadiene having from 20 to 72 percent vinyl unsaturation, from 34 to 13 percent by weight of a monomer including diallyl maleate and trimethylol propane trimethacrylate and not more than 1 percent by weight of a catalyst selected from the class consisting of 2,5-dimethyl-2,5 di-t-butylperoxy hexane and dicumyl peroxide.

5. The dry type transformer of claim 4 wherein said granular filler material comprises substantially round particulate silicon dioxide having a maximum ferrous oxide content of 0.110 percent and a majority of the silicon dioxide by weight having particles ranging in size from 1981 to 833 microns.

6. The dry type transformer of claim 4 wherein said resin has a viscosity below 250 centipoises at 100 degrees centigrade and a weight loss below 10 percent after two weeks at 300 degrees centigrade.

7. An encapsulating composition comprising: from 25 to 18 percent by weight of a resin composition including from 66 to 87 percent by weight of the polymer polybutadiene having from 20 to 72 percent vinyl unsaturation; from 34 to 13 percent by weight of a monomer including diallyl maleate and trimethylol propane trimethacrylate; not more than 1.5 percent by weight of a catalyst selected from the group consisting of 2,5-dimethyl-2,5 di-t-butylperoxy hexane, and dicumyl peroxide; and an inhibitor selected from the group consisting of 1,4-benzenediol and t-butyl catechol; and from 75 to 82 percent by weight of a substantially pure silicon dioxide having a maximum of 0.110 percent ferrous oxide by weight and having generally rounded particles with a majority of the silicon dioxide having particles in the range of 1981 to 833 microns.

8. The encapsulating composition of claim 3 wherein the viscosity of the composition is less than 250 centipoises at 100 degrees centigrate and the weight loss below 10 percent after two weeks at 300 degrees centigrade.

References Cited
UNITED STATES PATENTS

| | | | |
|---|---|---|---|
| 2,948,930 | 8/1960 | Herbst | 336—96 X |
| 3,161,843 | 12/1964 | Hodges et al. | 336—96 |
| 3,340,327 | 9/1967 | Spellberg et al. | 260—872 |

MORRIS LIEBMAN, Primary Examiner

L. T. JACOBS, Assistant Examiner

U.S. Cl. X.R.
260—40, 41.5, 879

Corrected Dedication

3,488,616.—*George I. Duncan* and *Robert D. Mees*, Fort Wayne, Ind. DRY TYPE TRANSFORMER WITH IMPROVED ENCAPSULATING COMPOSITION. Patent dated Jan. 6, 1970. Dedication filed Sept. 22, 1971, by the assignee, *General Electric Company*.

Hereby dedicates to the Public the above-identified patent.

[*Official Gazette March 21, 1972.*]